United States Patent
McKenna et al.

(10) Patent No.: US 10,262,360 B2
(45) Date of Patent: Apr. 16, 2019

(54) DEPOSIT VISUALIZATION

(71) Applicant: NCR Corporation, Duluth, GA (US)

(72) Inventors: Mike McKenna, Dundee (GB); Stephen Glencross, Dunfermine (GB)

(73) Assignee: NCR Corporation, Atlanta, GA (US)

( * ) Notice: Subject to any disclaimer, the term of this patent is extended or adjusted under 35 U.S.C. 154(b) by 986 days.

(21) Appl. No.: 14/291,553

(22) Filed: May 30, 2014

(65) Prior Publication Data

US 2015/0348183 A1    Dec. 3, 2015

(51) Int. Cl.
| | |
|---|---|
| *G06Q 20/18* | (2012.01) |
| *G07F 19/00* | (2006.01) |
| *G06Q 40/02* | (2012.01) |
| *G06Q 20/10* | (2012.01) |

(52) U.S. Cl.
CPC .......... *G06Q 40/02* (2013.01); *G06Q 20/10* (2013.01); *G06Q 20/1085* (2013.01); *G06Q 20/18* (2013.01); *G07F 19/00* (2013.01); *G07F 19/202* (2013.01)

(58) Field of Classification Search
None
See application file for complete search history.

(56) References Cited

U.S. PATENT DOCUMENTS

| | | | | |
|---|---|---|---|---|
| 8,437,528 | B1 * | 5/2013 | Csulits | G07D 7/04 382/135 |
| 2008/0135609 | A1 * | 6/2008 | Dcosta | G06Q 20/042 235/379 |
| 2009/0313167 | A1 * | 12/2009 | Dujari | G06Q 20/042 705/43 |
| 2011/0137453 | A1 * | 6/2011 | Doi | G06Q 20/381 700/214 |
| 2012/0023017 | A1 * | 1/2012 | Votaw | G06Q 20/1085 705/43 |
| 2014/0078318 | A1 * | 3/2014 | Alameh | G06F 3/0304 348/207.99 |
| 2015/0363755 | A1 * | 12/2015 | Walden | G06Q 40/02 705/43 |

* cited by examiner

*Primary Examiner* — Joseph W. King
(74) *Attorney, Agent, or Firm* — Schwegman, Lundberg & Woessner

(57) ABSTRACT

A multiple banknote and/or check deposit transaction at a Self-Service Terminal (SST) permits visual customer feedback during the transaction for depicting categories and denominations associated with the transaction. Moreover, an interface rendered with the visual customer feedback permits the customer to review, edit, accept, or abort the transaction.

12 Claims, 6 Drawing Sheets

DEPOSIT VISUALIZATION

BACKGROUND

Many bank customers make large deposits of cash and/or checks at an Automated Teller Machine (ATM). Such, deposit may entail a variety of denominations for any banknotes (currency) being deposit along with, in some cases, checks.

Currently, a summary of the transaction is presented on the ATM display as a table, which lists the number and totals for each denomination and any checks separately. The customer wants to ensure the deposit is accurate, so the customer manually verifies what is listed in the table against what the customer had noted for the deposit. This can be a time consuming and laborious task.

Therefore, it is desirable to provide an improve way for the customer to verify deposits of banknotes and/or checks.

SUMMARY

In various embodiments, methods and an SST for deposit visualization are presented.

According to an embodiment, a method for deposit visualization is provided. Specifically, an item breakdown for a deposit transaction having multiple different items associated with currency is obtained. Next, each item breakdown is presented in a graphical format within a rendered screen on a display during the deposit transaction.

DETAILED DESCRIPTION

Figure 1A:
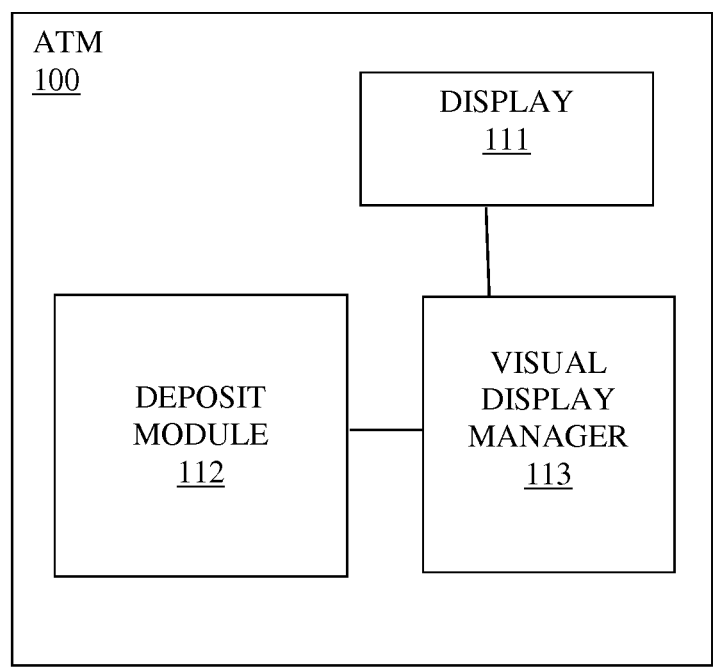
FIG. 1A is a diagram of Automated Teller Machine (ATM) for practicing deposit visualization, according to an example embodiment.

FIG. 1A is a diagram of Automated Teller Machine (ATM) for practicing deposit visualization, according to an example embodiment. It is to be noted that the components are shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or less components are possible without departing from the teachings of deposit visualization, presented herein and below.

As used herein, "currency" may include: a banknote issued from any government, a virtual currency not issued from any government, and checks.

Also, a "banknote" may include paper bills or coins issued from any government.

The ATM 100 includes a display 111, a deposit module 112, and a visual display manager 113.

The display 111 is interfaced to various applications or modules that provide presentations to the customer during a transaction at the ATM 100 within one or more screens rendered to the display 1111.

The deposit module 112 is capable of accepting multiple banknotes issued from multiple governments (United States, United Kingdom, Japan, etc.) through a deposit slot (not shown in the FIG. 1A). The deposit module 112 is also capable of receiving checks with the banknotes. The banknotes and/or checks do not have to be in any particular order when deposited. The deposit module 112 sorts the deposit of banknotes and identifies each denomination (and from which government each denomination is issued) and identifies an amount listed for any checks being deposited.

In an embodiment, the deposit module 112 (through the slot) can accept the banknotes and/or checks as a stack inserted into the slot by a customer making a deposit at the ATM 100.

Conventionally, the deposit module 112 or another interfaced module within the ATM 100 provides a summary of the deposit within a rendered screen on the display 111 for the customer to independently verify what the deposit module 112 identified for deposit versus what the customer believes was deposited. This summary is provided in a text form only as a table, which makes it time consuming and difficult for the consumer to verify what the consumer believes was being deposited versus what the deposit module 112 calculated as being deposited.

The visual display manager 113 is added to enhance the conventional table format and interface that are typically provided to the consumer for a deposit that includes multiple banknotes and/or multiple checks.

The output from the deposit module 112 is either directly supplied to the visual display manager 113 for a deposit or is acquired from another module from which the visual display manager's output is provided.

In an embodiment, the output from the deposit module 112 is rerouted to the visual display manager 113.

In an embodiment, the output from the deposit module 112 is intercepted by the visual display manager 113 (here the visual display manager 113 monitors the output of the deposit module 112 during a multiple banknote and/or multiple check deposit.

In an embodiment, the module that typical renders the conventional table presentation and related interface for output of the deposit module 112 is enhanced or replaced by the visual display manager 113.

The visual display manager 113 presents a new graphical summary of a multiple banknote and/or multiple check deposit and provides an improved customer-friendly interface for the customer to interact with to complete the transaction.

The graphical summary is presented within a rendered screen of the display 111. The screen presentation can include separate graphical representations for the quantity of each banknote denomination, each banknote denomination by issuing government, and any deposited check. The graphical representations may visually be presented as stacks that are staggered to convey a quantity for each stack (each stack representing a denomination, a denomination by issuing government, and any checks). Thus, a stack of 5 twenty dollar bills would appear larger within the visual presentation of the rendered screen than a stack of 2 one hundred dollar bills.

Moreover, each graphical representation may include accompanying text labels that identify the denomination, denomination by issuing government, and any checks. Still further, each presented stack may include another text label showing a total deposit quantity for that stack. For example, a stack of 5 twenty dollar bills may include a label showing it is a twenty dollar bill along with a number 5 above the stack.

Still further each category of item being deposited (United States banknotes, United Kingdom banknotes, and any checks) may include a label depicted a total for that category within the screen.

In addition, the rendered screen presented by the visual display manager 113 includes selectable options providing an interface to the customer. For example, the customer may select options within the screen, via a touchscreen display 111, to deposit more items (banknotes and/or checks), view or edit any deposited checks, return all the checks, confirm a total for the deposit, request assistance (from a local or remote teller (via video link from the ATM 100)), return the customer's bankcard, go back to a previous rendered screen that appeared before the current screen being rendered, and others.

In an embodiment, the graphical representations of the categories and the stacks are interactive on the screen, such that the customer can tap one or swipe through a particular category. For example, the customer may select a graphical representation within the rendered screen for the checks being deposited by touching the stack of checks within the screen. From here, the customer may see another rendered screen that allows the customer to swipe through each image of each check and see an amount determined for that check by the deposit module 112. If something appears off with the amount, an edit button within the screen can be selected and the customer can adjust the proper amount. However, if the deposit module 112 is unable to confirm the adjusted amount, the customer may be provided an option to receive that check back and withdraw it from the deposit transaction.

So, the interface can result in multiple different rendered screens of visualization from the customer, which is interactive and which permit the customer to more easily comprehend, adjust, confirm, of cancel a multiple banknote and/or multiple check deposit transaction at the ATM 100.

Figure 1B:
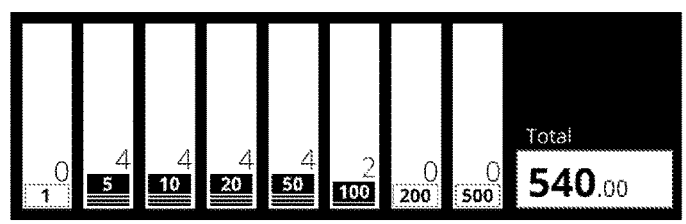
FIG. 1B is a diagram depicting a sample visualization of a banknote deposit having multiple denominations of the banknotes, according to an example embodiment.

FIG. 1B is a diagram depicting a sample visualization of a banknote deposit having multiple denominations for the banknotes, according to an example embodiment.

It is noted that the visualization and interface (selectable buttons) is but one example presentation and interface for a multiple banknote deposit at an ATM 100, according to embodiments presented herein.

It is also noted that FIG. 1B is for banknotes, which can be issued from any government (although not likely the United States, since $200 denominations do not exist and $500 denominations have been discontinued, although some may still exist in circulation).

The graphical presentation is provided within a rendered screen on the display 111 for the ATM 100 along with an interface. There are depicted denominations for ones, fives, tens, twenties, fifties, hundreds, two hundreds, and five hundreds. There is a label for each denomination showing its total for the deposit (0 ones, 4 fives, 4 tens, 4 twenties, 4 fifties, 2 one hundreds, 0 two hundreds, and 0 five hundreds). The labels for each denomination appear above the graphical stack images. There is also a total for the category (banknotes from issuing government), which for this example is 540.00. Moreover, the provided interface includes options for the customer to, add more banknotes to the deposit, return the banknotes and abort the deposit, confirm the deposit, go back to a previous screen or action in the deposit transaction, return the customer's bankcard, or request assistance for the deposit transaction.

Figure 1C:
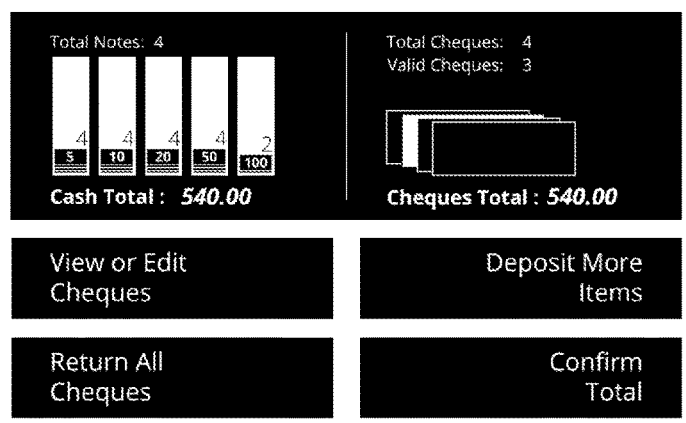
FIG. 1C is a diagram depicting a sample visualization of a mixed deposit having both banknotes and checks, according to an example embodiment.
Figure 1C:
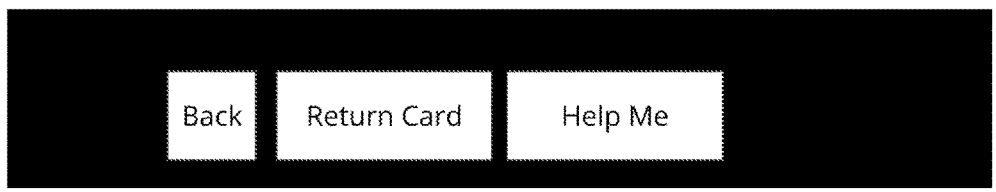

FIG. 1C is a diagram depicting a sample visualization of a mixed deposit having both banknotes and checks, according to an example embodiment.

Again, it is noted that the visualization and interface (selectable buttons) is but one example presentation and interface for a multiple banknote and multiple check deposit at an ATM 100, according to embodiments presented herein.

FIG. 1C shows both multiple banknotes (a first category and may include issuing government (not depicted in the FIG. 1C)) and multiple checks (a second category) being deposited by a customer. In the FIG. 1C any denomination that is not part of the deposit is omitted from the presentation within the screen of the display 111 for the ATM 100. In addition, a second category (checks) are simultaneously presented within the screen (here three checks were identified as valid for a total of 540.00 but four checks in total were detected with the transaction). A new interface option (from that which was depicted in the FIG. 1B) permits the customer to view or edit the checks or return all the checks (the labels for the interface options in the FIG. 1C were also slightly altered in some instances from that which was depicted in the FIG. 1B).

One now appreciates how a multiple banknote and/or multiple check deposit by a customer at an ATM 100 can be improved for customer ease of use and comprehension to expedite the transaction at the ATM 100 and provide more assurance to the customer regarding the transaction.

Some of embodiments of the FIGS. 1A-1C and other embodiments are now discussed with reference to the FIGS. 2-4.

Figure 2:
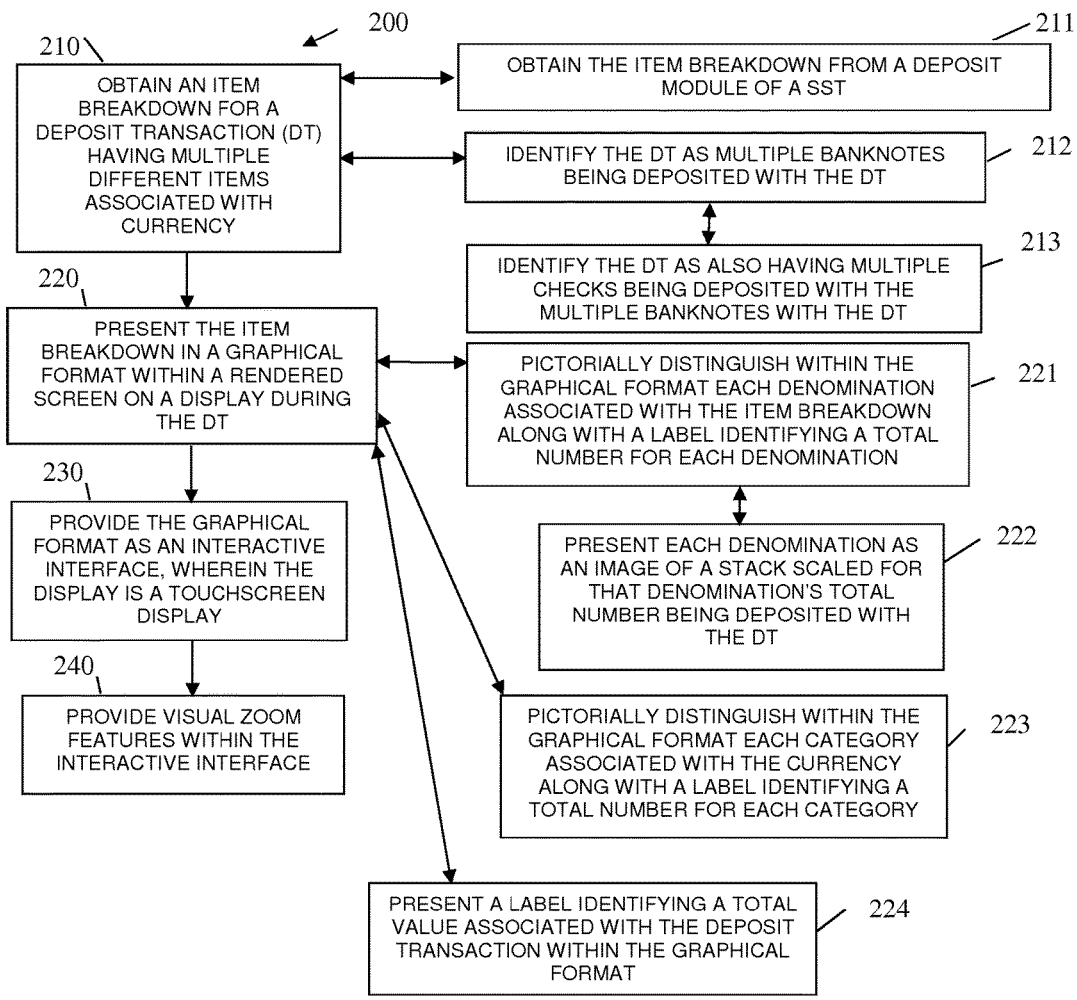
FIG. 2 is a diagram of a method for deposit visualization, according to an example embodiment.

FIG. 2 is a diagram of a method 200 for deposit visualization, according to an example embodiment. The software module(s) that implements the method 200 is referred to as a "deposit visualizer." The deposit visualizer is implemented as executable instructions programmed and residing within memory and/or a non-transitory computer-readable (processor-readable) storage medium and executed by one or more processors of a device. The processor(s) of the device that executes the deposit visualizer are specifically configured and programmed to process the deposit visualizer. The deposit visualizer may or may not have access to one or more network connections during its processing. Any such network connections can be wired, wireless, or a combination of wired and wireless.

In an embodiment, the device that executes the deposit visualizer is the ATM 100 of the FIG. 1.

In an embodiment, the device that executes the deposit visualizer is a Self-Service Terminal (SST), such as a self-service coin deposit kiosk.

In an embodiment, the deposit visualizer is the visual display manager 113 of the FIG. 1.

Figure 3:
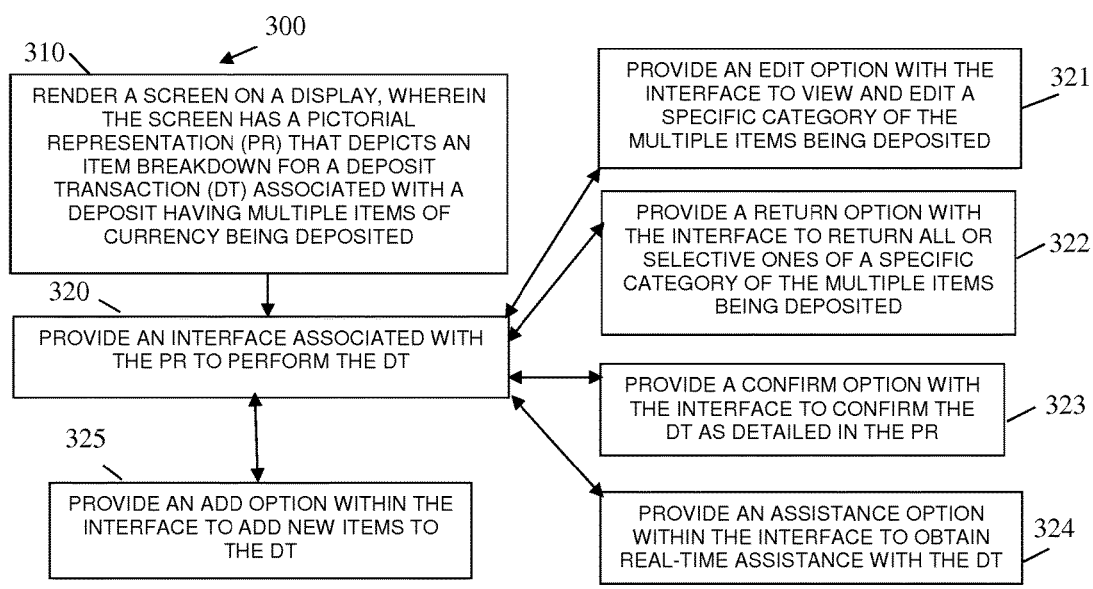
FIG. 3 is a diagram of another method for deposit visualization, according to an example embodiment.
Figure 4:
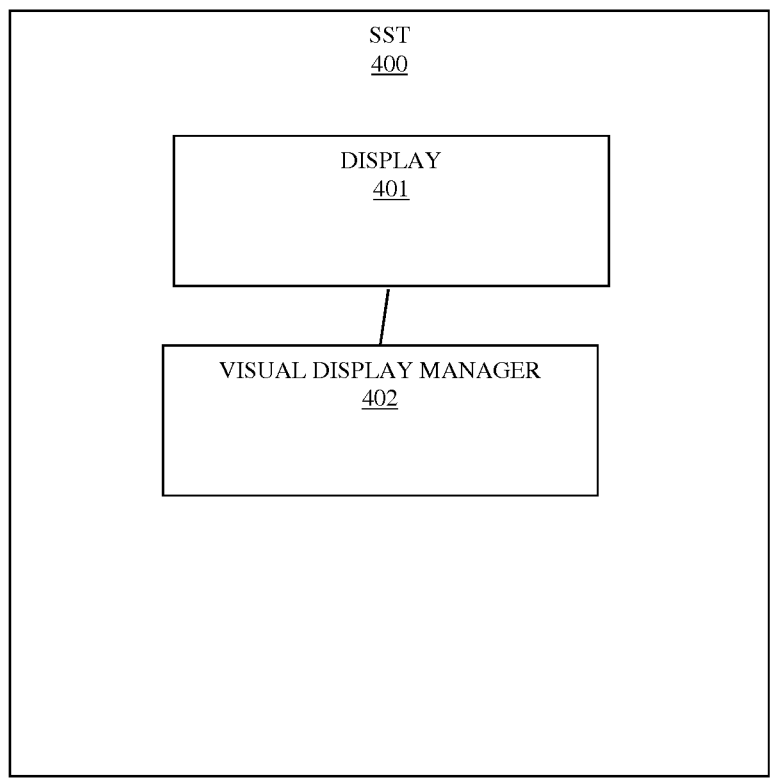
FIG. 4 is a diagram of a Self-Service Terminal, according to an example embodiment.

It is noted that for purposes of the embodiments discussed with the FIGS. 2-4, a banknote can include a coin in addition to a paper bill.

At 210, the deposit visualizer obtains an item breakdown for a deposit transaction having multiple different items associated with currency.

In an embodiment, the item break down is obtained from the deposit module 112 of the FIG. 1.

In an embodiment, the item breakdown is obtained from a module interfaced to the deposit module 112 of the FIG. 1.

According to an embodiment, at 211, the deposit visualizer obtains the item breakdown from a deposit module of a SST (e.g., ATM or coin deposit kiosk).

In an embodiment, at 212, the deposit visualizer identifies the deposit transaction as multiple banknotes being deposited with the deposit transaction.

In an embodiment of 212 and at 213, the deposit visualizer identifies the transaction as also having multiple checks being deposited with the multiple banknotes with the deposit transaction.

In an embodiment, the deposit visualizer identifiers the deposit transaction as multiple banknotes from multiple different issuing governments.

At 220, the deposit visualizer presents the item breakdown in a graphical format within a rendered screen on a display during the deposit transaction. Some example graphical formats for the rendered screen are presented above with reference to the FIGS. 1B and 1C.

According to an embodiment, at 221, the deposit visualizer pictorially distinguishes within the graphical format each denomination associated with the item breakdown along with a label identifying a total number of each such denomination (examples provided in the FIGS. 1B and 1C above).

In an embodiment of 221 and at 222, the deposit visualizer presents each denomination as an image stack scaled for that denomination's total number being deposited with the deposit transaction (examples provided in the FIGS. 1B and 1C).

In an embodiment, at 223, the deposit visualizer pictorially distinguishes within the graphical format each category associated with the currency along with a label identifying a total number for each category (examples provided in the FIG. 1C (banknotes with checks being deposited together)).

In an embodiment, at 224, the deposit visualizer presents a label identifying a total value associated with the deposit transaction within the graphical format (examples provided in the FIGS. 1B and 1C).

According to an embodiment, at 230, the deposit visualizer provides the graphical format as an interactive interface, where the display is a touchscreen display. This was discussed above with reference to the FIGS. 1A-1C.

In an embodiment of 230 and at 240, the deposit visualizer provides visual zoom features within the interactive interface to zoom in and out of particular ones of the items or categories of the currency for more details or for images associated therewith.

In an embodiment, the graphical format includes distinguishing colors for different information associated with the items or the deposit. This may also include visual effects, such as flashing items, of visual shapes and textures. These colors, effects, and shapes are designed to draw the attention of the depositor (customer) to information of import during the deposit transaction.

FIG. 3 is a diagram of another method 300 for deposit visualization, according to an example embodiment. The software module(s) that implements the method 300 is referred to as a "deposit interface manager." The deposit interface manager is implemented as executable instructions programmed and residing within memory and/or a non-transitory computer-readable (processor-readable) storage medium and executed by one or more processors of a device. The processors that execute the deposit interface manager are specifically configured and programmed to process the deposit interface manager. The deposit interface manager may or may not have access to one or more network connections during its processing. Any such network connections can be wired, wireless, or a combination of wired and wireless.

In an embodiment, the device that executes the deposit interface manager is the ATM 100 of the FIG. 1.

In an embodiment, the device that executes the deposit interface manager is a SST, such as a self-service coin deposit kiosk.

The deposit interface manager differs from the deposit visualizer of the FIG. 2 in that the deposit visualizations include some enhanced interface options for a customer making a multiple banknote and/or multiple check deposit.

At 310, the deposit interface manager renders a screen on a display. The screen has a pictorial representation that depicts an item breakdown for a deposit transaction, which is associated with a deposit having multiple items of currency being deposited.

At 320, the deposit interface manager provides an interface, associated with the pictorial representation, to perform the deposit transaction.

In an embodiment, at 321, the deposit interface manager provides an edit option with the interface to view and edit a specific category of the multiple items being deposited. For example, the "View or Edit Cheques" button presented in the FIG. 1C (checks being a category separate from banknotes).

In an embodiment, at 322, the deposit interface manager provides a return option with the interface to return all or selective ones of a specific category of the multiple items being deposited. For Example, the "Return All Cheques" button presented in the FIG. 1C.

In an embodiment, at 323, the deposit interface manager provides a confirm option with the interface to confirm the deposit transact ad detailed in the pictorial representation (examples shown in the FIGS. 1B and 1C).

In an embodiment, at 324, the deposit interface manager provides an assistance option within the interface to obtain real-time assistance with the deposit transaction (examples shown with the "Help Me" button in the FIGS. 1B and 1C).

In an embodiment, at 325, the deposit interface manager provides an add option within the interface to add new items to the deposit transaction (example shown in the FIG. 1B and also the FIG. 1C through the "View or Edit Cheques" (where edit can include adding a new check)).

FIG. 4 is a diagram of a SST 400, according to an example embodiment. The SST 400 includes a variety of hard ware components and software components. The software components of the SST 400 are programmed and reside within memory and/or a non-transitory computer-readable medium and execute on one or more processors of the SST 400. The SST 400 communicates one or more networks, which can be wired, wireless, or a combination of wired and wireless.

In an embodiment, the SST 400 is the ATM 100.

In an embodiment, the SST 400 is a self-service coin deposit kiosk.

The SST 400 includes a display 401 and a visual display manager 402.

The visual display manager 402 is adapted and configured to: execute on the SST 400, render a screen on the display 401 representing a pictorial representation for an item breakdown of a deposit transaction having multiple items of currency, and provide an interface associated with the pictorial representation to conduct the transaction.

In an embodiment, the deposit transaction includes one or more of: multiple different denominations of banknotes and multiple checks. In an embodiment of the latter embodiment, the pictorial representation includes a pictorial stack representing each denomination along with a label depicting a quantity for that denomination.

According to an embodiment, the interface is to permit user interaction with components of the pictorial representation to view and edit each item associated with the deposit transaction. This was discussed above with reference to the FIG. 1A.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    receiving, by a deposit module of an Automated Teller Machine (ATM), a deposit transaction that includes currency issued from multiple different governments and checks, wherein the receiving further includes processing the deposit transaction from a stack of the currency with no order that separates the currency by a specific issuing government or by check;
    obtaining, from the deposit module, an item breakdown for the deposit transaction having multiple different items of currency, each item of currency for the item breakdown identifying a denomination when that item is cash, whether that item is a check, and an issuing government for that item; and
    presenting, by a display manager, the item breakdown received from the deposit module, wherein presenting further includes presenting the item breakdown in a graphical format within a rendered screen on a display during the deposit transaction, and wherein the presenting further includes providing interactive options accessible from the rendered screen for at least: continuing with the deposit transaction at the ATM, editing particular checks, depositing additional items; returning all of the checks provided with deposited items, requesting assistance, returning any customer-bankcard, and returning back to a previously rendered screen that preceded the rendered screen;
    confirming a total amount for the deposit transaction; and
    providing at least one interactive option permitting a graphical image of a stack of the checks to be swiped through for individually viewing and verifying each deposited check associated with the deposit transaction.

2. The method of claim 1, wherein the presenting further includes pictorially distinguishing within the graphical format each denomination associated with the item breakdown along with a label identifying a total number for each denomination.

3. The method of claim 2, wherein the pictorially distinguishing further includes presenting each denomination as an image of a currency stack scaled for that denomination's total number being deposited with the deposit transaction.

4. The method of claim 1, wherein the presenting further includes pictorially distinguishing within the graphical format each item of the currency along with a label identifying a total number for that item.

5. The method of claim 1, wherein the presenting further includes presenting a label identifying a total value associated with the deposit transaction within the graphical format.

6. The method of claim 1 further comprising, providing the graphical format as an interactive interface, wherein the display is a touchscreen display.

7. The method of claim 6, wherein the providing further includes providing visual zoom features within the interactive interface.

8. A method, comprising:
    rendering a screen on a display of an Automated Teller Machine (ATM), wherein the screen has a pictorial representation that depicts an item breakdown for a deposit transaction associated with a deposit having multiple items of currency being deposited for multiple issuing governments and checks, and wherein the rendering further includes receiving the item breakdown from a deposit module interfaced to the ATM, the deposit module processing the multiple items of currency from a deposited stack of currency having no order that separated out specific issuing governments or the checks; and
    providing an interface associated with the pictorial representation to perform the deposit transaction at the ATM through interactive actions identified by the interface, wherein at least one interactive action permitting a stack of the checks to be swiped through for individually viewing and verifying each deposited check associated with the deposit transaction, and wherein providing further includes providing the interface with interactive options that at least include: editing any of the deposited checks, adding additional items to the deposit transaction, returning all of the deposited checks, and confirming a total for the deposit transaction, requesting assistance, returning any customer-bankcard, and returning back to a previously rendered screen a current rendered screen associated with the interactive options.

9. The method of claim 8, wherein the providing further includes providing an assistance option within the interface to obtain real-time assistance with the deposit transaction.

10. A self-service terminal (SST), comprising:
    a display;
    at least one processor
    a deposit module; and
    a visual display manager configured and adapted to: i) execute on the at least one processor of the SST, ii) render a screen on the display representing a pictorial representation for an item breakdown of a deposit transaction having multiple items of currency, wherein the multiple items of currency are issued by different issuing governments and include checks, and wherein the deposit module of the SST receives a stack of the multiple items for processing in no order that separates the items into specific issuing governments or the checks, and wherein the visual display manager obtains the item breakdown from the deposit module once the deposit module has processed the stack, and iii) provide an interface associated with the pictorial representation to conduct the deposit transaction, having at least one interface option permitting a stack of the checks to be swiped through on the display for individually viewing and verifying each deposited check associated with the deposit transaction, and provided with the interface interactive options for at least: editing any of the checks, depositing more items with the deposit transaction, returning all deposited checks, and confirming a total for the deposit transaction, requesting assistance, returning any customer-bankcard, and returning back to a previously rendered screen that preceded a current rendered screen associated with the interface interactive options.

11. The SST of claim 10, wherein the deposit transaction includes one or more of: multiple different denominations of banknotes and multiple checks.

12. The SST of claim 11, wherein the pictorial representation includes a pictorial stack representing each denomination along with a label depicting a quantity for that denomination.

\* \* \* \* \*